June 5, 1923.
J. B. HEISER
1,457,735
VALVE PROTECTING TIRE CARRIER
Filed Dec. 16, 1921
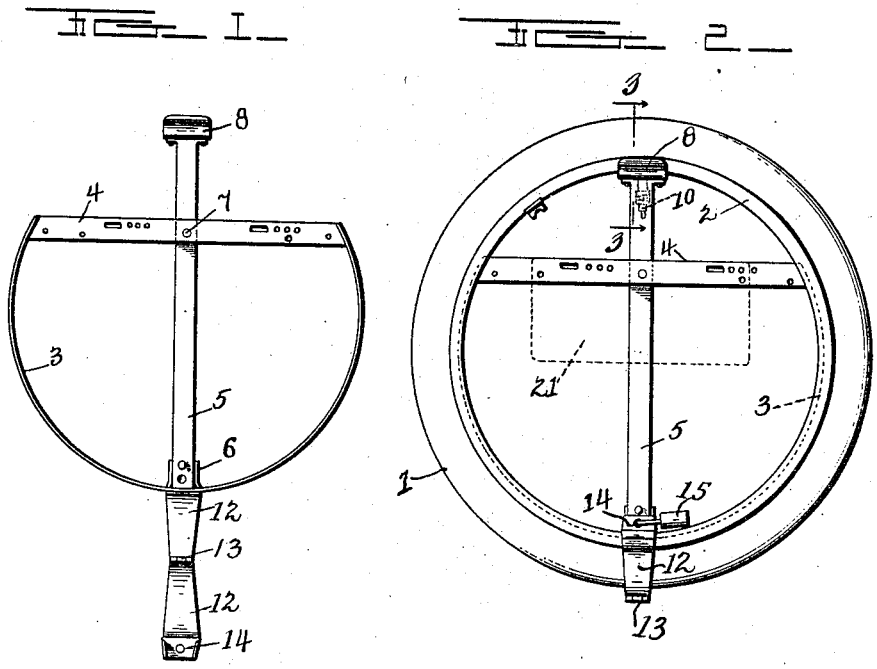
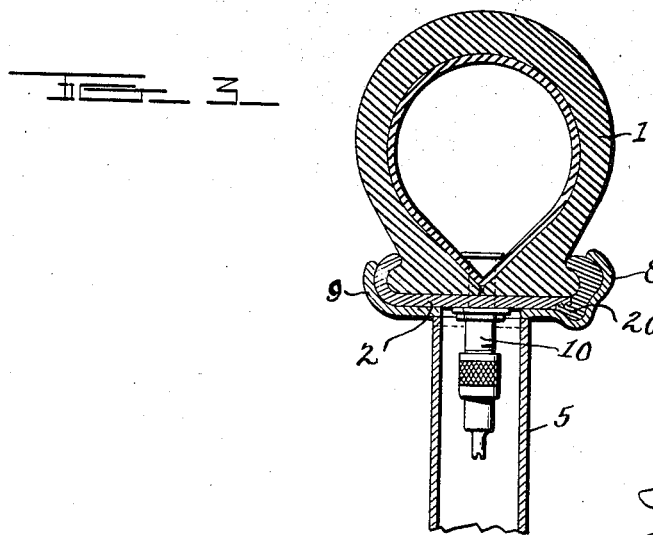
Inventor
J. B. Heiser
Attorney Patented June 5, 1923.

1,457,735

UNITED STATES PATENT OFFICE.

JOSEPH B. HEISER, OF WILLIAMSPORT, PENNSYLVANIA.

VALVE-PROTECTING TIRE CARRIER.

Application filed December 16, 1921. Serial No. 522,798.

*To all whom it may concern:*

Be it known that I, JOSEPH B. HEISER, a citizen of the United States, residing at Williamsport, in the county of Lycoming and State of Pennsylvania, have invented certain new and useful Improvements in Valve-Protecting Tire Carriers; and I do hereby declare the following to be a full, clear, and exact description of the invention, such as will enable others skilled in the art to which it appertains to make and use the same.

This invention relates to a valve protecting tire carrier with means for locking the rim and tire together, and has for its object to provide an apparatus which will be simple in construction, comparatively inexpensive to manufacture, and more efficient in use than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a view of the improved tire carrier detached from the tire and rim;

Figure 2 is a view of the inflated tire surrounding the rim with my improved carrier in place within the rim; and Figure 3 is a cross section on the line 3—3 of Figure 2, illustrating how the carrier receives and protects the inflating valve from unauthorized persons who would seek to deflate the tire.

1 indicates any pneumatic tire provided with the usual rim 2, and 3 indicates a steel band of semicircular shape, but preferably having more than 180° of arc, and provided with the steel cross piece 4, all as will be clear from Figure 1. Rising from near the center of the arc shaped member 3 is the hollow post like member 5, secured to the arc member 3, as by the brackets 6, and secured to the cross member 4 as by a rivet or other fastening means 7. This said upright hollow member 5 is of a length equal to the diameter of the rim 2, and at its upper end is provided with the flaring members 8 and 9, see Figure 3, which are adapted to fit closely the tire rim 2, all as will be clear from the drawings. The said diametrically disposed upright tubular member 5 being hollow as illustrated, the stem of the inflating valve 10 is received inside said hollow tube 5, as will readily be understood from Figures 2 and 3, so that when the said member 5 is in place, it is not possible for any evil disposed person to get at the inflating valve 10 and deflate the tire 1.

Rigidly secured to the arc shaped carrier 3 is a holding strap or clamp 12 as illustrated, and said strap is provided with the hinge 13 and a flange 14 on its outer end, so that the whole is adapted to fold over the rim 2 and tire 1, into the position shown in Figure 2, whereupon a lock 15 of any suitable design or construction may secure said carrier 3, rim 2, and tire 1 together.

When it is desired to attach the rim and tire to the carrier for the purpose of securing the parts together, it is only necessary to force the arc shaped member 3 inside the rim 2, and fold over the locking clamp or strap 12 and lock the carrier to the rim and tire, whereupon the parts will occupy the positions illustrated in Figure 2. That is, the arc shaped rim 3 will snugly fit inside the rim 2 and come up against the usual flange 20 with which said rim is provided, so that the arc shaped member 3 will occupy the dotted line position illustrated in Figure 2. When it is desired to detach the rim and tire from the carrier, it is only necessary to unlock the clamp and unfold it into the position shown in Figure 1, whereupon the lower end of the post or tube 5 may be forced along with the lower portion of the arc shaped member 3 out of the rim 2. The parts will pivot around the flanges 8 and 9 of the post 5 as a center during this movement, with the result that the post 5 may be readily withdrawn from around the valve stem, and the rim and tire be made ready for use.

It will now be clear that the above construction possesses the following important advantages: The tire being inflated, it can not be withdrawn from the rim unless the valve 10 is opened for the purpose of deflating the tire, but so long as the post 5 is in the position shown in Figure 2, enclosing the valve stem, it is not possible for a thief or evil disposed person to manipulate the valve 10, and therefore, it is not possible for the tire 1 to be deflated and detached from the rim.

In addition to this, the clamp 12 encircles both the rim 2 and the tire 1, and therefore, binds the carrier, rim and tire firmly together, so that it is not possible to remove the carrier unless the lock 15 is picked or destroyed.

It is therefore evident that by protecting the air valve, the tire can not be removed from the rim and by locking both the rim and tire to the carrier a double assurance of safety against theft is had.

The cross member 4 can be conveniently utilized to support a license tag 21 as indicated in dotted lines, Figure 2.

It is obvious that those skilled in the art may vary the details of the invention without departing from the spirit thereof, and therefore, I do not wish to be limited to the above disclosure except as may be required by the claims.

What I claim is:

1. In a carrier for a pneumatic tire, provided with a rim, the combination of an arc shaped member adapted to fit inside said rim; a post diametrically secured in said rim; a clamp adapted to detachably secure said rim and tire to said arc shaped member and post; and means to securely hold said clamp in position, substantially as described.

2. In a valve protecting carrier for a pneumatic tire provided with an inflating valve and a rim; the combination of an arc shaped member adapted to fit inside said rim; a hollow diametrically disposed post adapted to receive and protect said valve associated with said arc shaped member; means to secure said post to said arc shaped member; and means to securely hold said tire and rim to said post and arc shaped member, substantially as described.

3. In a valve protecting carrier for a pneumatic tire provided with an inflating valve and a rim, the combination of an arc shaped member adapted to fit inside said rim; a cross member secured to said arc shaped member; a hollow post secured to said arc shaped member and to said cross member and adapted to receive and protect said valve associated with said arc shaped member; and means to securely hold said tire and rim to said post and arc shaped member, substantially as described.

4. In a valve protecting carrier for a pneumatic tire having an inflating valve and a rim, the combination of holding means adapted to fit the interior of said rim; a hollow post adapted to receive said valve, said post being diametrically disposed of said rim and having a flange at one end adapted to fit one side of said rim; means disposed transversely of said post to secure the latter to said arc shaped member; and means to secure said holding means and said post to said rim and tire, substanially as described.

In testimony whereof I affix my signature.

JOSEPH B. HEISER.